(12) United States Patent
Kopylov et al.

(10) Patent No.: US 11,695,788 B1
(45) Date of Patent: Jul. 4, 2023

(54) FILTERING STRATEGIES FOR SUBGRAPH MATCHING ON NOISY MULTIPLEX NETWORKS

(71) Applicant: HRL Laboratories, LLC, Malibu, CA (US)

(72) Inventors: Alexei Kopylov, Pasadena, CA (US); Jiejun Xu, Diamond Bar, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 346 days.

(21) Appl. No.: 17/063,151

(22) Filed: Oct. 5, 2020

Related U.S. Application Data

(63) Continuation-in-part of application No. 17/021,542, filed on Sep. 15, 2020.

(60) Provisional application No. 62/952,913, filed on Dec. 23, 2019, provisional application No. 62/945,023, filed on Dec. 6, 2019.

(51) Int. Cl.
| | |
|---|---|
| *H04L 9/40* | (2022.01) |
| *H04L 41/08* | (2022.01) |
| *H04L 41/0816* | (2022.01) |
| *H04L 41/084* | (2022.01) |

(52) U.S. Cl.
CPC ...... *H04L 63/1416* (2013.01); *H04L 41/0816* (2013.01); *H04L 41/0843* (2013.01); *H04L 41/0886* (2013.01); *H04L 63/1425* (2013.01); *H04L 63/1466* (2013.01)

(58) Field of Classification Search
USPC ........................................................ 726/22
See application file for complete search history.

(56) References Cited

U.S. PATENT DOCUMENTS

| | | |
|---|---|---|
| 8,533,825 B1 | 9/2013 | Marsa |
| 8,966,036 B1 * | 2/2015 | Asgekar .............. H04W 4/08 |
| | | 707/706 |

(Continued)

FOREIGN PATENT DOCUMENTS

| | | | | |
|---|---|---|---|---|
| WO | WO-2019103912 A2 * | 5/2019 | ............ | G06N 3/08 |

OTHER PUBLICATIONS

Weinstein, Clifford, et al. Modeling and Detection Techniques for Counter-Terror Social Network Analysis and Intent Recognition. Aerospace Conference, 2009 IEEE. IEEE, 2009, pp. 1-16.

(Continued)

*Primary Examiner* — Sakinah White Taylor
(74) *Attorney, Agent, or Firm* — Tope-McKay & Associates

(57) ABSTRACT

Described is a system for detecting adversarial activities based on detection of activity patterns in a multiplex network. The system detects one or more subnetworks that are matches to a template network of template nodes. The subnetworks are detected by filtering multiplex network nodes according to a filtering criteria that utilizes monotone function properties in the multiplex network. Nodes that do not meet the filtering criteria are eliminated, resulting in a list of candidate nodes in the multiplex network. The one or more subnetworks are formed from the list of candidate nodes. An activity pattern corresponding to a pattern of adversarial activity is identified in the one or more subnetworks. Based on the identified activity pattern, an alert of adversarial activity is generated and transmitted.

12 Claims, 11 Drawing Sheets

(56) References Cited

U.S. PATENT DOCUMENTS

| | | | |
|---|---|---|---|
| 11,201,890 B1 | 12/2021 | Coull | |
| 11,394,725 B1* | 7/2022 | Cho | H04L 63/1425 |
| 2004/0221163 A1* | 11/2004 | Jorgensen | H04L 9/3066 |
| | | | 713/182 |
| 2015/0188941 A1 | 7/2015 | Boshmaf | |
| 2020/0201910 A1 | 6/2020 | Gavaudan | |
| 2020/0244673 A1* | 7/2020 | Stockdale | H04L 63/1425 |

OTHER PUBLICATIONS

Campbell, William, et al. Social Network Analysis with Content and Graphs. MIT Lincoln Laboratory Journal 20: pp. 62-81. 2013.
Smith, Steven T., et al. Covert Network Detection. Lincoln Laboratory Journal vol. 20, No. 1, 2013, pp. 47-61.
F. Krzakala, C. Moore, E. Mossel, J. Neeman, A. Sly, L. Zde-borov, P. Zhang. Spectral Redemption in Clustering Sparse Networks. In Proceedings of the National Academy of Sciences (PNAS), 2013, vol. 110, No. 52, pp. 20935-20940.
Money Laundering at Lebanese Bank. Taken from archive.nytimes.com/www.nytimes.com/interactive/2011/12/13/world/middleeast/lebanese-money-laundering.html?ref=middleeast, downloaded on Nov. 5, 2020.
D. Koutra, H. Tong, and D. Dubinsky. Big-Align: Fast Bipartite Graph Alignment. In IEEE International Conference on Data Mining (ICDM), 2013, pp. 389-398.
K. Shvachko, H. Kuang, S. Radia, and R. Chansler. The Hadoop Distributed File System. In IEEE 26th Symposium on Mass Storage Systems and Technologies (MSST), 2010, pp. 1-10.
V. K. Vavilapalli, A. C. Murthy, Chris Douglas, S. Agarwal, M. Konar, R. Evans, T. Graves, J. Lowe, H Shah, S Seth, B. Saha, C. Curino, O. O'Malley, S. Radia, B. Reed, E. Baldeschwieler. Apache Hadoop YARN: Yet Another Resource Negotiator. In SoCC, 2013, pp. 1-16.
M. Zaharia, M. Chowdhury, M. J. Franklin, S. Shenker, and I. Stoica. Spark: Cluster Computing with Working Sets. In USENIX HotCloud, 2010, pp. 1-7.
M. Krivelevich and B. Sudakov. The Largest Eigenvalue of Sparse Random Graphs. Combinatorics, Probability and Computing (2003) 12, pp. 61-72.
D. A. Spielman and S.-H. Teng. Nearly-Linear Time Algorithms for Preconditioning and Solving Symmetric, Diagonally Dominant Linear Systems. In SIAM Journal on Matrix Analysis and Applications, 2014, vol. 35, No. 3, pp. 835-885.
J. Ham, D. Lee, and L. Saul. Semisupervised Alignment of Manifolds. In Proc. 10th Int'l Workshop Artificial Intelligence and Statistics, 2005, pp. 120-127.
C. Wang, S. Mahadevan. A General Framework for Manifold Alignment. In AAAI Fall Symposium on Manifold Learning and its Application, 2009, pp. 79-86.
H. Tong, C. Faloutsos, B. Gallagher, and T Eliassi-Rad. Fast Best-Effort Pattern Matching in Large Attributed Graphs. In ACM SIGKDD Conference on Knowledge Discovery and Data Mining, 2007, pp. 737-746.
J. Tang Zhang, C. Ma, H. Tong, Y. Jing, J. Li: Panther: Fast Top-k Similarity Search on Large Networks. In Acm SIGKDD Conference on Knowledge Discovery and Data Mining, 2015, pp. 1445-1454.
W. Aiello, F. Chung, and L. Lu. A random graph model for power law graphs. Exp. Math. 10, pp. 53-66, 2001.
B. Bhattarai, H. Liu, and H. H. Huang. Ceci: Compact embedding cluster index for scalable subgraph matching. In Proceedings of the 2019 International Conference on Management of Data, pp. 1447-1462. ACM, 2019.
M. Dickison, M. Magnani, and L. Rossi. Multilayer Social Networks. Cambridge University Press, Chapter 2.3, p. 32, 2016.
B. Du, S. Zhang, N. Cao, and H. Tong. First: Fast interactive attributed subgraph matching. In Proceedings of the 23rd ACM SIGKDD International Conference on Knowledge Discovery and Data Mining, pp. 1447-1456. ACM, 2017.
H. W. Kuhn and B. Yaw. The hungarian method for the assignment problem. Naval Res. Logist. Quart, pp. 83-97, 1955.
M. Magnani and L. Rossi. Formation of multiple networks, pp. 257-264. Springer, Germany, 2013.
B. A. Miller, M. S. Beard, P. J.Wolfe, and N. T. Bliss. A spectral framework for anomalous subgraph detection. IEEE Transactions on Signal Processing, 63(16): pp. 4191-4206, 2015.
J. D. Moorman, Q. Chen, T. K. Tu, Z. M. Boyd, and A. L. Bertozzi. Filtering methods for subgraph matching on multiplex networks. In 2018 IEEE International Conference on Big Data (Big Data), pp. 3980-3985, Dec. 2018.
X. Ren and J.Wang. Exploiting vertex relationships in speeding up subgraph isomorphism over large graphs. Proc. VLDB Endow., 8(5): pp. 617-628, Jan. 2015.
Y. Tian and J. M. Patel. Tale: A tool for approximate large graph matching. In 2008 IEEE 24th International Conference on Data Engineering, pp. 963-972. IEEE, 2008.
H. Tong, C. Faloutsos, C. Faloutsos, B. Gallagher, and T. Eliassi-Rad. Fast best-effort pattern matching in large attributed graphs. In Proceedings of the 13th ACM SIGKDD international conference on Knowledge discovery and date mining, pp. 737-746. ACM, 2007.
A. Kopylov and J. Xu, "Filtering Strategies for Inexact Subgraph Matching on Noisy Multiplex Networks," 2019 IEEE International Conference on Big Data (Big Data), Los Angeles, CA, USA, 2019, pp. 4906-4912, doi: 10.1109/BigData47090.2019.9006047.
Office Action 1 for U.S. Appl. No. 17/021,542, dated Oct. 6, 2022.
Response to Office Action 1 for U.S. Appl. No. 17/021,542, dated Oct. 6, 2022.

* cited by examiner

| Technique | AUC (Nodes) | AUC (Edges) | AUC (Noisy Nodes) | AUC (Noisy Edges) |
|---|---|---|---|---|
| HRL | 1.00 | 1.00 | 1.00 | 1.00 |
| UMASS, Soft Seeding Match | 0.81 | N/A | N/A | N/A |
| UCLA (Lit. Ref. No. 7) | 0.96 | 0.96 | N/A | N/A |
| STR | 0.93 | 0.74 | 0.84 | 0.65 |
| MAGNUN, A | 0.65 | 0.80 | 0.67 | 0.82 |
| MAGNUN, B | 0.86 | 0.79 | 0.75 | 0.64 |
| MAGNUN, STL | 0.75 | 0.71 | 0.85 | 0.48 |

FIG. 6

Algorithm FindMatch (T,B, epsilon)
input:
 query template, *T*
 background, *B*
 precision, epsilon
output:
 for each template node find a list of candidates that may belong to a matching with minimum cost up to given precision
 a := identity function
 uBound := Cost(T,a(T))
 lBound := 0
Repeat
 mBound=(uBound+lBound)/2
 candidates := Filter(T,B,mBound)
 if candidate[i] is empty for some template node I
  then lBound:=mBound
  else uBound:=mBound
until uBound − lBound < epsilon

FIG. 10

Algorithm: Filter (T, B, Bound)
input: query template *T*
multiplex network, *B*
max cost, Bound
output: for each template node find a list of candidates that may belong to a matching with a cost less than Bound
Repeat
For each template node *i*
For each background node *x*
$J :=$ set of nodes connected to *i* in *T*
$Y :=$ all candidates for *J*
Find $a: J \rightarrow Y$ that minimize $\sum_{j \in J} Cost(i, j, x, a(j))$
If this cost >Bound
then remove *x* from candidate list of *i*
until convergence

FIG. 11

FILTERING STRATEGIES FOR SUBGRAPH MATCHING ON NOISY MULTIPLEX NETWORKS

CROSS-REFERENCE TO RELATED APPLICATIONS

This is a Continuation-in-Part of U.S. application Ser. No. 17/021,542, filed Sep. 15, 2020, entitled, "A Computational Framework for Modeling Adversarial Activities," which is a Non-Provisional application of U.S. Provisional Patent Application No. 62/952,913, filed Dec. 23, 2019, entitled, "A Computational Framework for Modeling Adversarial Activities", the entirety of which is incorporated herein by reference.

This is a Non-Provisional application of U.S. Provisional Patent Application No. 62/945,023, filed Dec. 6, 2019, entitled, "Filtering Strategies for Inexact Subgraph Matching on Noisy Multiplex Networks", the entirety of which is incorporated herein by reference.

GOVERNMENT LICENSE RIGHTS

This invention was made with government support under U.S. Government Contract Number FA8750-17-C-0153 awarded by DARPA. The government has certain rights in the invention.

BACKGROUND OF INVENTION

(1) Field of Invention

The present invention relates to a system for detecting adversarial activities and, more particularly, to a system for detecting adversarial activities based on detection of activity patterns in a multiplex network.

(2) Description of Related Art

Networks are fundamental modeling tools for a wide range of application domains, such as social network analysis, biological network inference, and cyber-physical system modeling. The term multiplex network refers to a specific type of network of networks (NoN), where multiple types of relationships (i.e., edges) exist between nodes. The co-existence of multiple relations are prevalent in many real-world scenarios. For instance, in social networks, users may be connected to each other through different online social network platforms. Similarly, in biological networks, different edge types can represent the similarities of genes measured by different metrics with respect to different diseases.

Many existing subgraph matching algorithms have been proposed in the past. For instance, matching algorithms proposed in the past (see Literature Reference Nos. 1 and 8 of the List of Incorporated Literature References) apply a branch-and-bound procedure along with an indexing structure to prune irrelevant subgraph regions and identify candidate nodes for matching. Through carefully designed pruning and filtering strategies, the subgraph search space can be reduced effectively. In addition, filtering-based methods are often parallelizable to take advantage of the distributed computing paradigm, which lead to further speedup on the subgraph matching process. However, one of the main drawbacks of this type of method is its lack of flexibility in matching. Due to the presence of potential noise in real-world networks, a perfectly matched subgraph may not exist. In other words, it is possible for an exact subgraph matching method to iterate over all possible candidates with significant computation time yet still returns nothing. In addition, a user may not know in advance the exact subgraph patterns for interactive and exploratory graph search (see Literature Reference No. 3). As a result, exact matching may not be suited for certain real-world scenarios.

On the other hand, different approaches have been proposed for inexact subgraph matching. Many of these methods rely on specific heuristics to identify important seed nodes, and then incrementally expand and find the next candidates in the neighboring nodes of the selected seeds (see Literature Reference Nos. 9 and 10). One of the main benefits of these methods is that it enables the discovery of similar subgraphs that are not isomorphic to the predefined templates. However, the greedy procedure used for partial search expansion could easily lead to deviation from the optimal search path and sub-optimal matching results.

Thus, a continuing need exists for a method that combines the strength of both exact and inexact subgraph matching to enable matching for noisy multiplex networks.

SUMMARY OF INVENTION

The present invention relates to a system for detecting adversarial activities and, more particularly, to a system for detecting adversarial activities based on detection of activity patterns in a multiplex network. The system comprises one or more processors and a non-transitory computer-readable medium having executable instructions encoded thereon such that when executed, the one or more processors perform multiple operations. The system detects, in a multiplex network comprising a plurality of multiplex network nodes, one or more subnetworks that are matches to a template network comprising a plurality of template nodes. Detecting the one or more subnetworks comprises filtering the plurality of multiplex network nodes according to a filtering criteria that utilizes monotone function properties in the multiplex network; eliminating nodes from the plurality of multiplex network nodes that do not meet the filtering criteria, resulting in a list of candidate nodes in the multiplex network; and forming the one or more subnetworks from the list of candidate nodes. An activity pattern corresponding to a pattern of adversarial activity is identified in the detected one or more subnetworks. Based on the identified activity pattern, an alert of adversarial activity is generated and transmitted.

In another aspect, detecting the one or more subnetworks further comprises filtering the plurality of multiplex network nodes according to an additional filtering criteria based on a maximum likelihood estimate of a match between a given template node and a given multiplex network node.

In another aspect, the multiplex network further comprises a plurality of edges and a plurality of types of configurations of edges linking the plurality of multiplex network nodes, and wherein the one or more processors further perform an operation of modeling noise in the multiplex network as a transition matrix, wherein each entry in the transition matrix is a probability of changing from one type of configuration to another type of configuration.

In another aspect, filtering the plurality of multiplex network nodes according to the additional filtering criteria comprises identifying an inexact match in the multiplex network for the template network by minimizing the following cost function: $\Sigma_{i,j:Nods(t)} \text{Cost}(i,j,m(i),m(j))$, where $\text{Cost}(i,j,x,y) = -\log P(T_{i,j}, B_{x,y})$, where $T_{i,j}$ is a type of configuration between a node $i$ and a node $j$ in the template network T, $B_{x,y}$ is a type of configuration between nodes x and y in the multiplex network B, P(a,b) is a probability that $T_{i,j}$ corresponds to $B_{x,y}$; and eliminating node x when the cost is greater than a predetermined value.

In another aspect, detecting the one or more subnetworks further comprises assigning matching nodes in the multiplex network to the plurality of template nodes using a Hungarian algorithm.

In another aspect, the multiplex network is a communications network comprising a plurality of edges linking the plurality of multiplex network nodes, and wherein each multiplex network node represents an individual, and each edge linking a pair of multiplex network nodes represents a communication between the individuals, and wherein the identified activity pattern is a communication pattern.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table illustrating results of a Real World Graph Challenge comparing the present invention to prior art methods;

FIG. 10 is an illustration of a matching algorithm according to some embodiments of the present disclosure; and FIG. 11 is an illustration of a filtering-based algorithm according to some embodiments of the present disclosure.

DETAILED DESCRIPTION

Figure 1:
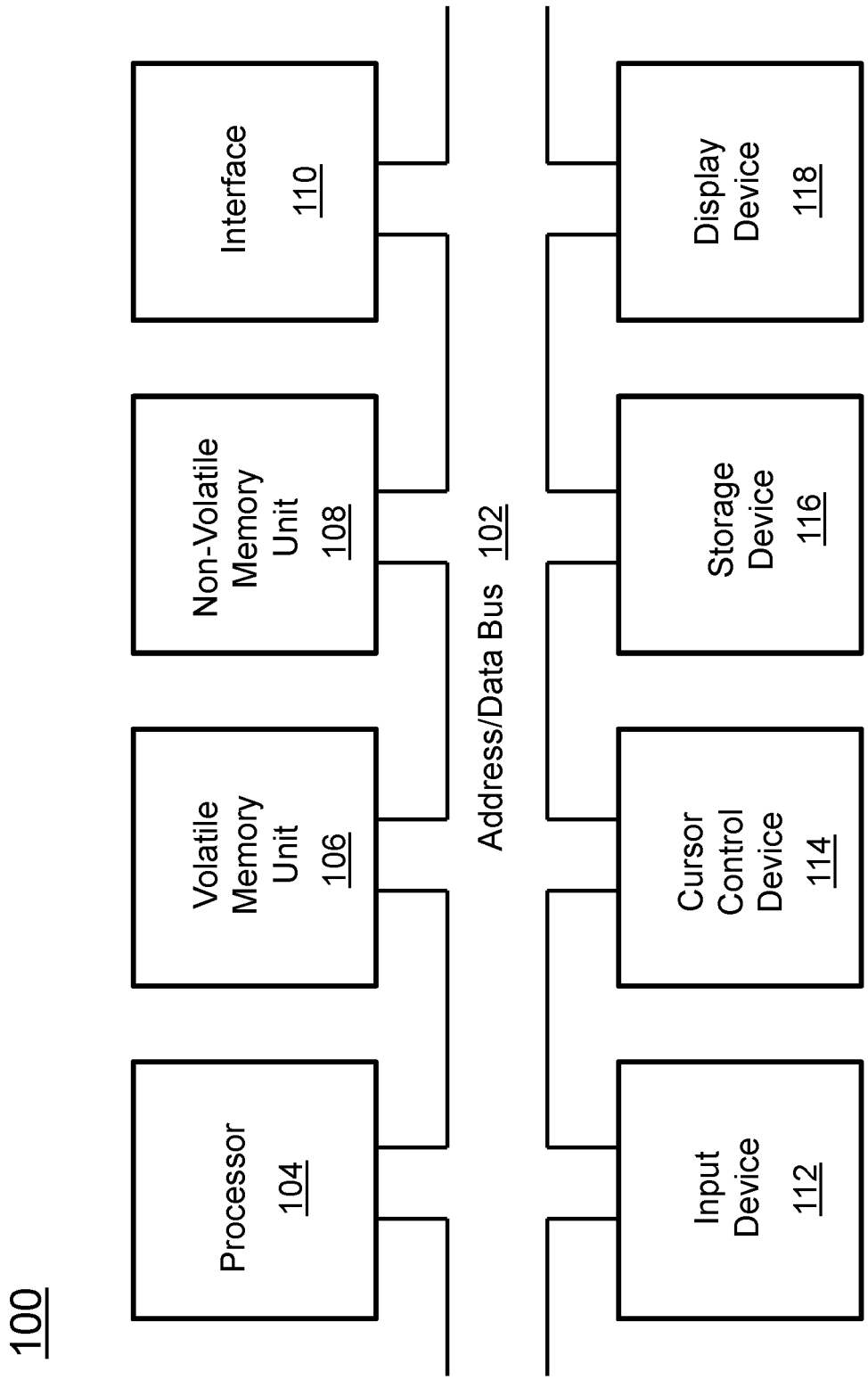
FIG. 1 is a block diagram depicting the components of a system for detecting adversarial activities according to some embodiments of the present disclosure.

The present invention relates to a system for detecting adversarial activities and, more particularly, to a system for detecting adversarial activities based on detection of activity patterns in a multiplex network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. B. Bhattarai, H. Liu, and H. H. Huang. Ceci: Compact embedding cluster index for scalable subgraph matching. In Proceedings of the 2019 International Conference on Management of Data, pages 1447-1462. ACM, 2019.

2. M. Dickison, M. Magnani, and L. Rossi. Multilayer Social Networks. Cambridge University Press, Chapter 2.3, pg. 32, 2016.

3. B. Du, S. Zhang, N. Cao, and H. Tong. First: Fast interactive attributed subgraph matching. In Proceedings of the 23rd ACM SIGKDD International Conference on Knowledge Discovery and Data Mining, pages 1447-1456. ACM, 2017.

4. H. W. Kuhn and B. Yaw. The hungarian method for the assignment problem. Naval Res. Logist. Quart, pages 83-97, 1955.

5. M. Magnani and L. Rossi. Formation of multiple networks, pages 257-264. Springer, Germany, 2013.

6. B. A. Miller, M. S. Beard, P. J.Wolfe, and N. T. Bliss. A spectral framework for anomalous subgraph detection. IEEE Transactions on Signal Processing, 63(16):4191-4206, 2015.

7. J. D. Moorman, Q. Chen, T. K. Tu, Z. M. Boyd, and A. L. Bertozzi. Filtering methods for subgraph matching on multiplex networks. In 2018 IEEE International Conference on Big Data (Big Data), pages 3980-3985, Dec. 2018.

8. X. Ren and J. Wang. Exploiting vertex relationships in speeding up subgraph isomorphism over large graphs. Proc. VLDB Endow., 8(5):617-628, Jan. 2015.

9. Y. Tian and J. M. Patel. Tale: A tool for approximate large graph matching. In 2008 IEEE 24th International Conference on Data Engineering, pages 963-972. IEEE, 2008.

10. H. Tong, C. Faloutsos, C. Faloutsos, B. Gallagher, and T. Eliassi-Rad. Fast best-effort pattern matching in large attributed graphs. In Proceedings of the 13th ACM SIGKDD international conference on Knowledge discovery and data mining, pages 737-746. ACM, 2007.

(2) Principal Aspects

Various embodiments of the invention include three "principal" aspects. The first is a system for detecting adversarial activities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
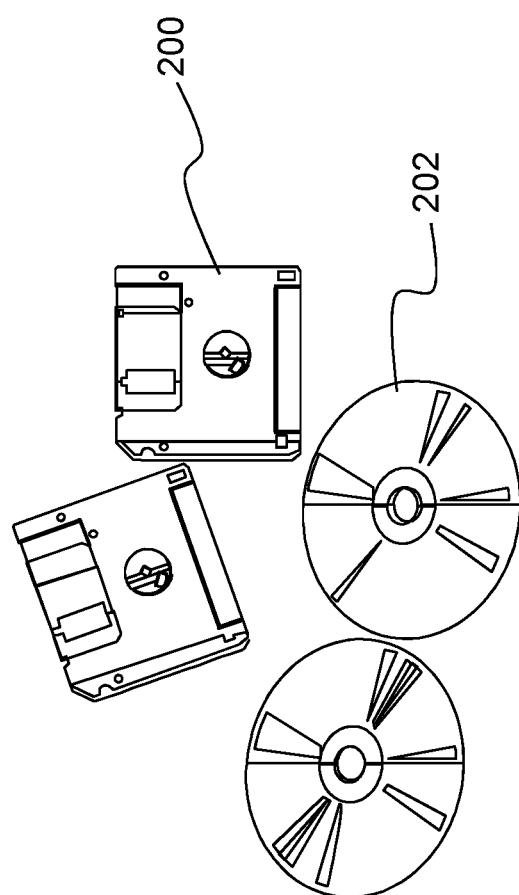
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a method for detection of adversarial activities by detecting matching subgraphs in a large multiplex background network based on predefined subgraph templates that are provided by the user as input. The approach extends existing filtering-based subgraph matching algorithms and sets forth a new set of filters leveraging the monotone function properties in the multiplex setting. Due to the presence of potential noise in real-world networks, a perfectly matched subgraph may not exist. In other words, it is possible for an exact subgraph matching method to iterate over all possible candidates with significant computation time yet still returns nothing. In addition, a user may not know in advance the exact subgraph patterns for interactive and exploratory graph search. As a result, exact matching may not be suited for certain real-world scenarios. The present invention combines the strength of both exact and inexact subgraph matching to enable matching for noisy multiplex networks. Specifically, a set of filtering strategies is introduced to expedite the detection of isomorphic subgraphs with respect to the given templates in the context of a multiplex networks. A multiplex network is a network model composed of a multiplicity of overlapping networks that capture the different types of connections between nodes within the network. This enables effective pruning of irrelevant subgraph regions and expedites the overall matching process.

In addition, the approach includes a unique strategy based on maximum likelihood estimate to identify both exact (isomorphic, i.e., corresponding or similar in form and relations) and inexact matches ("closely matched" subgraphs that are not isomorphic) to the given templates from a noisy background network. Two graphs which contain the same number of graph vertices connected in the same way are referred to as isomorphic. In the present invention, the goal is to match the same person/user/entity across networks. In this context, a "closely matched" subgraph is one that is not isomorphic to the given template; however, its deviation (e.g., measured in graph edit distance (i.e., a measure of similarity between graphs)) from the template is within a bound. The threshold value used in CANON is subject to use case. A user can specify such a threshold value according to desired applications. For example, some users may want to have wide net, while some may only want to have exact match. In one embodiment of the present invention, a ranked list is returned. Graph edit distance, given the size of nodes, essentially bounds the possible number of maximum edits to transform one graph to match the other. As a non-limiting example, the bound is the top-k best effort matches in the output ranked list (e.g. top 5 or top 10 of matched subgraphs). This allows one to generalize this approach to real-world networks, which are often noisy, incomplete, and ambiguous. The effectiveness of the method described herein was demonstrated on a real-world multiplex network provided by the DARPA Modeling Adversarial Activity (MAA) program. The approach according to embodiments of the present disclosure obtains highly accurate subgraph matching results for both the clean and noisy versions of the network, which outperforms the baseline filtering methods (shown in in FIG. 6 and described in further detail below). Furthermore, the approach is parallelizable such that it can scale up to handle large input networks. The goal of the MAA program is to develop mathematical and computational techniques for modeling adversarial activity for the purpose of producing high-confidence indications and warnings. The method according to embodiments of this disclosure can be used to find suspicious activities to identify adversarial activity. Significantly, the method according to embodiments of the present disclosure gives less false positives than existing state-of-the-art approaches. Each of these aspects will be described in further detail below.

(3.1) Exact Matching (3.1.1) Background

A multiplex network is defined with n channels as a tuple $(G, E_1, E_2, \ldots, E_n)$, where $(G, E_k)$ corresponds to a network for each $k=1, 2, \ldots, n$. In other words, G is a set of nodes that are common across channels, and $E_k$'s are the sets of edges that are specific to the channel k. In a non-limiting example, the nodes represent people, and the channels represent the types of communication between the people (e.g., channel 1 is phone communication, channel 2 is email communication, channel 3 is a financial transaction). The edges from $E_k$ are referred to as edges of type k. A network $(G', E'_1, E'_2, \ldots, E'_n)$ is a subnetwork of $(G, E_1, E_2, \ldots, E_n)$, if G' is a subset of G and each $E'_k$. Furthermore, a network $(G', E'_1, E'_2, \ldots, E'_n)$ is an induced subnetwork of $(G, E_1, E_2, \ldots, E_n)$, if G' is a subset of G, and each $E'_k$ is exactly the set of edges in $E_k$ that has both end nodes in G' (i.e., $E'_k = E_k \cap (G' \times G')$). The terms graph and network, and subgraph and subnetwork, are used interchangeably throughout.

In this section, the following network inference problem is considered. Given two multiplex networks, a small one (called the template) and a large one (called the background), the aim is to find (potentially multiple copies of) a subnetwork in the background network that is isomorphic to the given template.

In the approach according to embodiments of the present disclosure, a graph/network will be encoded as a (sparse) adjacency matrix, and a multiplex graph/network will be encoded as a set of matrices of the same size. Let $B_k$ be the set of adjacency matrices for the background network (i.e., $B_{k,x,y}$ is a number of edges of channel k between nodes x and y), and let $T_k$ be the set of adjacency matrices for the template (of channel k). $B_k$ captures the node interactions in channel k. A matching between a template and a background is defined as an injective function m: Nodes(T)→Nodes(B). A matching m is represented by a matrix M, where $M_{i,x}=1$ if m(i)=x and $M_{i,x}=0$ otherwise. It is clear that M is a 0-1 matrix with exactly one 1 on each row, and at most one 1 on each column. A matrix with this property is called a matching matrix.

A matching is exact if for any template edge (i,j), there is a distinct edge of the same type (m(i), m(j)) in the background. That is, the number of edges in the background between nodes m(i) and m(j) is greater than or equal to the number of edges in the template between nodes i and j: $B_{k,m(i),m(j)} \geq T_{k,i,j}$. Using matrix notations, one can formulate the exact matching problem as finding a matching matrix M such that $$B_k \geq M^T T_k M, \quad (1)$$

for each k=1, 2, . . . , n, where such a matching is denoted as $T_k \prec_M B_k$.

It is assumed that there are t nodes in the template and b nodes in the background. The dimension of the $B_k$, $T_k$, and M matrices are b×b, t×t, and t×b, respectively. Typically, letters i, j are used to denote nodes in a template, and letters x, y are used to denote nodes in a background.

(3.1.2) Filtering Method

Inspired by the approach described in Literature Reference No. 7, the exact subgraph matching problem was addressed using a filtering-based strategy as follows. For each node i in the given template, a set of candidate nodes is maintained from the background network. The set of candidate nodes is tracked with a matrix C of size t×b, where $C_{ix}$ is set to 1 if a background node x is a candidate for the corresponding template node i, and 0 if the possibility that there is a subnetwork of B that is an exact match between the template and the background such that m(i)=x is ruled out.

Initially all background nodes are considered as valid candidates for each template node. In other words, C is set to all ones. Then, candidate nodes are progressively eliminated (or removed) from a candidate list according to some filtering criteria (described below). Once a background node x is removed from the candidate list for the template node i, the corresponding entry is assigned as zero (i.e., $C_{ix}=0$). This process is repeated until it converges. Ideally, it converges to a matching matrix, where there is exactly one candidate for each template node. In this case, a single matching subgraph is found in the large multiplex background network. However, this is not always the case, and more than one candidate may be found for one or more template nodes. This situation may arise due to the weak pruning power of filters, especially when a large number of candidates exist for the template nodes. It could also indicate that there is actually more than one exact match between the template and the background network. In experimental studies on the real-world dataset provided in the DARPA MAA program, the latter case is observed. The method according to embodiments of the present disclosure is able to enumerate all possible candidate networks and identify the multiple exact matching subgraphs. The basis of the filtering method described herein consists of the filters described in Literature Reference No. 7. One of the main filters there is the Topology Filter, which is described in the following.

(3.1.2.1) Topology Filter

Consider the scenario with an edge between i and j in the template, and node x in the background. If node i corresponds to x, then there should be some candidate node y for j so that the number of edges in the background between x and y should be greater or equal to the number of edges in the template between nodes i and j. This essentially leads to the following condition:

$$\max_y B_{x,y} C_{j,y} \geq T_{i,j}. \quad (2)$$

Thus, if equation (2) does not hold, one can safely eliminate the corresponding node x from the candidate list of node i. The elimination process is repeated until it converges (see Algorithm 1 below). In other words, the process will repeat until equation (2) holds for any x, i, j. This filtering strategy is applied for each layer, that is, for each pair of matrices ($B_k$, $T_k$).

Algorithm 1 Topology Filter (B, T) (Literature Reference No. 7)

repeat
if $\max_y B_{x,y} C_{j,y} < T_{i,j}$ for i, j, x then
$C_{i,x} := 0$
end if
until convergence (3.1.3) Monotone Matrix Functions The following are additional strategies to augment the basic filters of Literature Reference No. 7 described above. These strategies can be applied to both the exact and inexact matching. Basic filters are augmented based on the matrix monotone properties, which provide additional criteria to create new filters such that the irrelevant regions of a background graph can be pruned more effectively.

In the present invention, in an exact match scenario, the method finds the matching instance; if not, the method finds the closely matching instance. The prior art filter is augmented based on the matrix monotone property to make it more powerful. A matrix function $f(X_1, \ldots, X_n)$ is called a monotone if, for any matching matrix M, if $T_k \prec_M B_k$ for each k=1, . . . , n, then $f(T_1, \ldots, T_n) \prec_M f(B_1, \ldots, B_n)$ means that a matching instance (corresponding to the template) is found. For instance, it is easy to show that the following functions are monotone:

Matrix transposition: if $T \prec_M B$ the $T^T \prec_M B^T$ (i.e., if a matching exists in the background graph B with respect to the template T, then a matching (with respect to the transpose of the template) also exists in the "transposed" background graph. This criteria allows formation of additional filters).

Matrix multiplication: if $T_1 \prec_M B_1$ and $T_2 \prec_M B_2$ then $T_1 T_2 \prec_M B_1 B_2$. For example, if $T_1$ is the template for channel 1 ($B_1$), and $T_2$ is the template for channel 2 ($B_2$). One can define a new filter based on multiplication of $T_1$ and $T_2$. Intuitively, each element in the resulting matrix indicates a compound path, where the first step is taken in channel 1 and the second step is taken channel 2. Then, this new filter can be applied to the connecting networks, which is the multiplication of $B_1$ and $B_2$.

Element-wise multiplication: if $T_1 \prec_M B_1$ and $T_2 \prec_M B_2$ then $T_1 \odot T_2 \prec_m B_1 \odot B_2$.

$\prec_M$ denotes that a matching instance (corresponding to the template) is found. Both the template and background graph undergo the same mathematical operation/transformation, and the matching instance corresponding to the "transformed template" can be found in the "transformed background graph".

Note that the composition of monotone functions is also monotone. Based on the monotone function properties, one can construct new filters to enhance the pruning effectiveness. For example, for any monotone function $f(X_1, \ldots, X_n)$, one can define TopologyFilter($f(B_1, \ldots, B_n)$, $f(T_1, \ldots, T_n)$) as a valid filter. TopologyFilter is a function which takes two inputs, where the first input is the "transformed" background graph, and the second input is the "transformed" template. This filter will be denoted as TopologyFilter$_f$. Note that some of the filters from Literature Reference No. 7 can be considered as a topology filter combined with appropriate monotone functions. While the filters (i.e., in-degree, out-degree, number of reciprocated edges) are described in Literature Reference No. 7, mathematically the same effect can be achieved by running topological filtering on specific configurations of the input adjacency matrices (i.e., X), where all filters are applied in every iteration. For example, the set of node-level statistic filters according to embodiments of the present disclosure can be expressed as follows:

In-degree: TopologyFilter$_f$ for $f(X)=(XX^T)\odot E$, where E is the identity matrix.

Out-degree: TopologyFilter$_f$ for $f(X)=(X^TX)\odot E$.

Number of reciprocated edges: TopologyFilter$_f$ for $f(X)=X\odot X^T$.

Suppose there are three channels (1=FriendFeed™, 2=Twitter™, 3=YouTube™)

$T_i * T_2$ corresponds to relation "I follow you on FriendFeed™ and Twitter™")

$T_1T_1^T$ corresponds to number of people that you and me both follow

In particular, it has outdegree of nodes on diagonal

Each of the functions corresponds to a new filter. In particular, $T_1T_1^T$ corresponds to the outdegree filter. One filter may be sufficient if extended properly using monotone functions. These additional filtering mechanisms greatly improve the effectiveness in finding exact matching subgraphs. The following is a discussion of a strategy for finding inexact matches.

(3.2) Inexact Matching

Inexact subgraph matching in noisy multiplex background network is formalized as follows. With inexact matching, the same filters are used as for exact matching; however, the background graph/network is a "noisy" version. Therefore, a probabilistic approach (e.g., maximum likelihood) is utilized to determine the likelihood a subgraph in the background network is a matching instance with respect to the template even though they are not exactly the same.

For each pair of nodes, a type of configuration is defined between two nodes based on the set of all possible edges linking the two nodes from the available channels. For example, if there is one channel and each pair of nodes has at most one edge in this channel, then there will be three possible types of configurations: (1) No edge; (2) Edge in one direction; and (3) Edge in the opposite direction.

Figure 3:
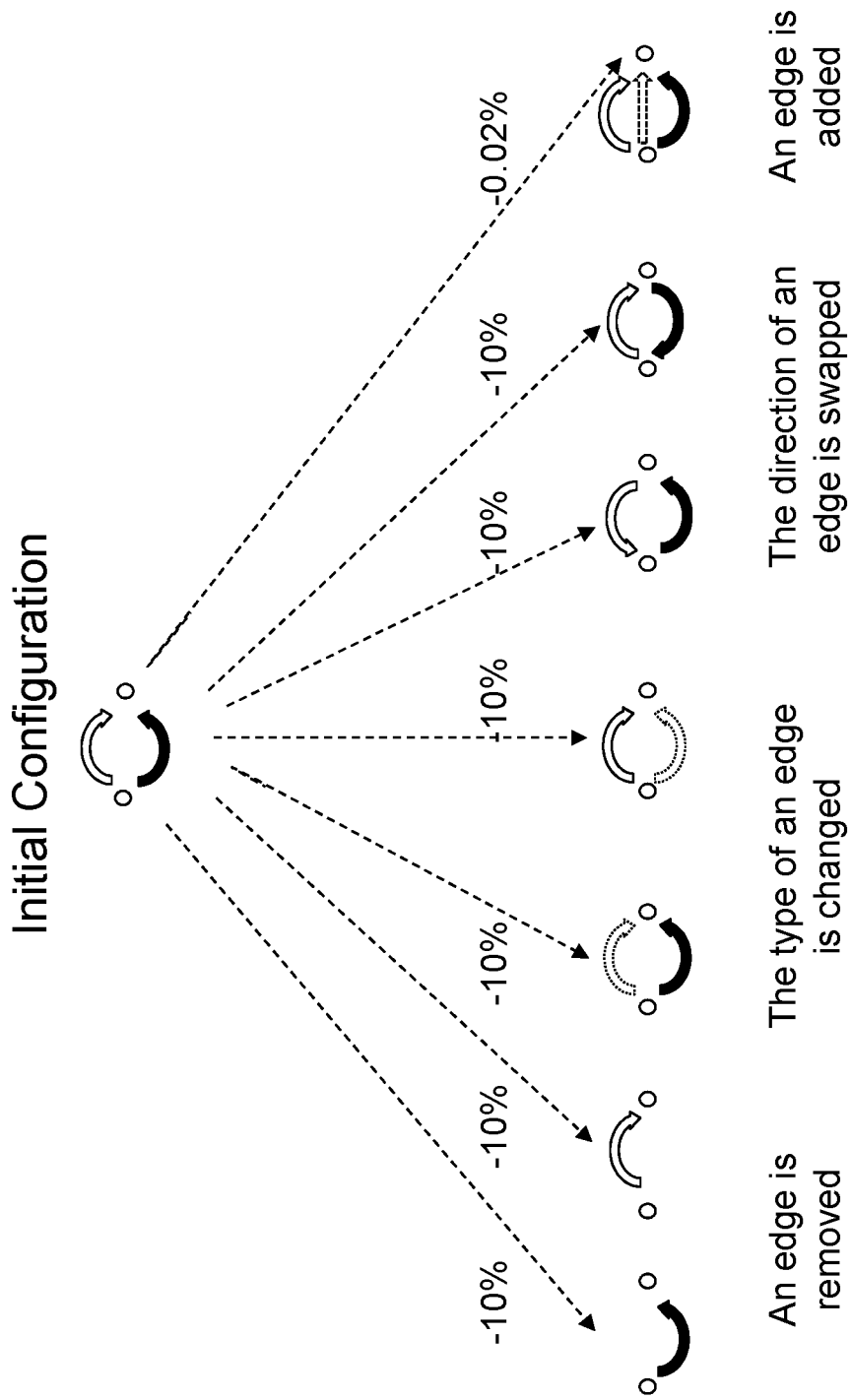
FIG. 3 is an illustration showing the transition probability (P) from one type of configuration to another according to some embodiments of the present disclosure.

Similarly, if there are three channels and each pair of nodes has at most one edge in each channel, then there will be $3^3=27$ possible types of configurations. The noise is modeled as a transition matrix P between possible types of configurations, where each entry in the transition matrix, $P_{ab}$, is a probability that a configuration of type a becomes a configuration of type b. FIG. 3 shows examples of different configurations and the transition probabilities from one type of configuration to another. The types of arrows (e.g., dashed line, solid line, bold line) represent the different channels. The probabilities are estimated based on the actual information of the noisy multiplex background network used in experiments. In this example, it is assumed a noisy multiplex background network is generated from a "clean" network where around 10% random edges were removed, an additional 10% random edges were added, and for 10% random edges, a type or direction have been changed. Note that the probability of transition to a new configuration where an additional edge is added is much lower (i.e., the probability is $(10\% \cdot e)/b^2$, where e is the number of edges and b is the number of nodes in the network).

Now suppose the configuration matrices for the template T and the noisy multiplex background B are given, where $T_{ij}$ and $B_{ij}$ are the type of connections between nodes i and j in the template and the background network, respectively. For each match m: Nodes(T)→Nodes(B), the likelihood of the match is defined as:

$$\Pi_{i,j:Nodes(T)} P(T_{ij}, B_{m(i),m(j)}). \tag{3}$$

The goal is to find a match that maximizes the likelihood. Alternatively, this problem can be formulated as minimizing the following cost function:

$$\Sigma_{i,j:Nodes(T)} \text{Cost}(i,j,m(i),m(j)),$$
$$\text{where Cost}(i,j,x,y) = -\log P(T_{ij}, B_{x,y}). \tag{4}$$

To solve the above problem, find the minimum number (Bound) such that the following inequality has a solution:

$$\Sigma_{i,j:Nodes(T)} \text{Cost}(i,j,m(i),m(j)) \leq \text{Bound}. \tag{5}$$

Binary search is used to find the minimum solution of equation (5). Initially, the value of Bound can be initialized to an arbitrary number; then for a given Bound, if a solution is successfully found, then its value will be decreased; otherwise, it will be increased. In order to find the matching nodes (e.g., i, x) to satisfy the inequality, a filtering method can be used. Note that if the following condition exists between a template node i and a background node x:

$$\sum_{j:Nodes(T)} \min_{\substack{y:Nodes(B) \\ y \in Candidate(j)}} \text{Cost}(i,j,x,y) > \text{Bound}, \tag{6}$$

then there will be no solution for the above inequality. Therefore, x can be excluded from the candidate set of i. In addition, a more aggressive filtering strategy is introduced to further improve the algorithm. Specifically, let J be all nodes connected to i in T, and let Y be all candidates for J. The aim is to find the best assignment a: J→Y that minimizes the cost: $\Sigma_{j\in J}\text{Cost}(i,j,x,a(j))$. If the cost is larger than the Bound, then there is no solution for the inequality problem such that m(i)=x. Therefore, x may again be eliminated from the candidate set of i. When nodes are removed from the candidate set of i, it's guaranteed that these nodes won't show up in the final results. Essentially, the goal is to design more aggressive and effective filters to prune the irrelevant nodes. This assignment problem (i.e., assigning the matching nodes in the background graph to the template nodes) can be addressed with the Hungarian algorithm (see Literature Reference No. 4). In practice, due to the high computational complexity for large networks, methods, such as Literature Reference No. 6, are often used to try to expedite the assignment process to identify a set of seed nodes in order to reduce the search space.

Figure 4:
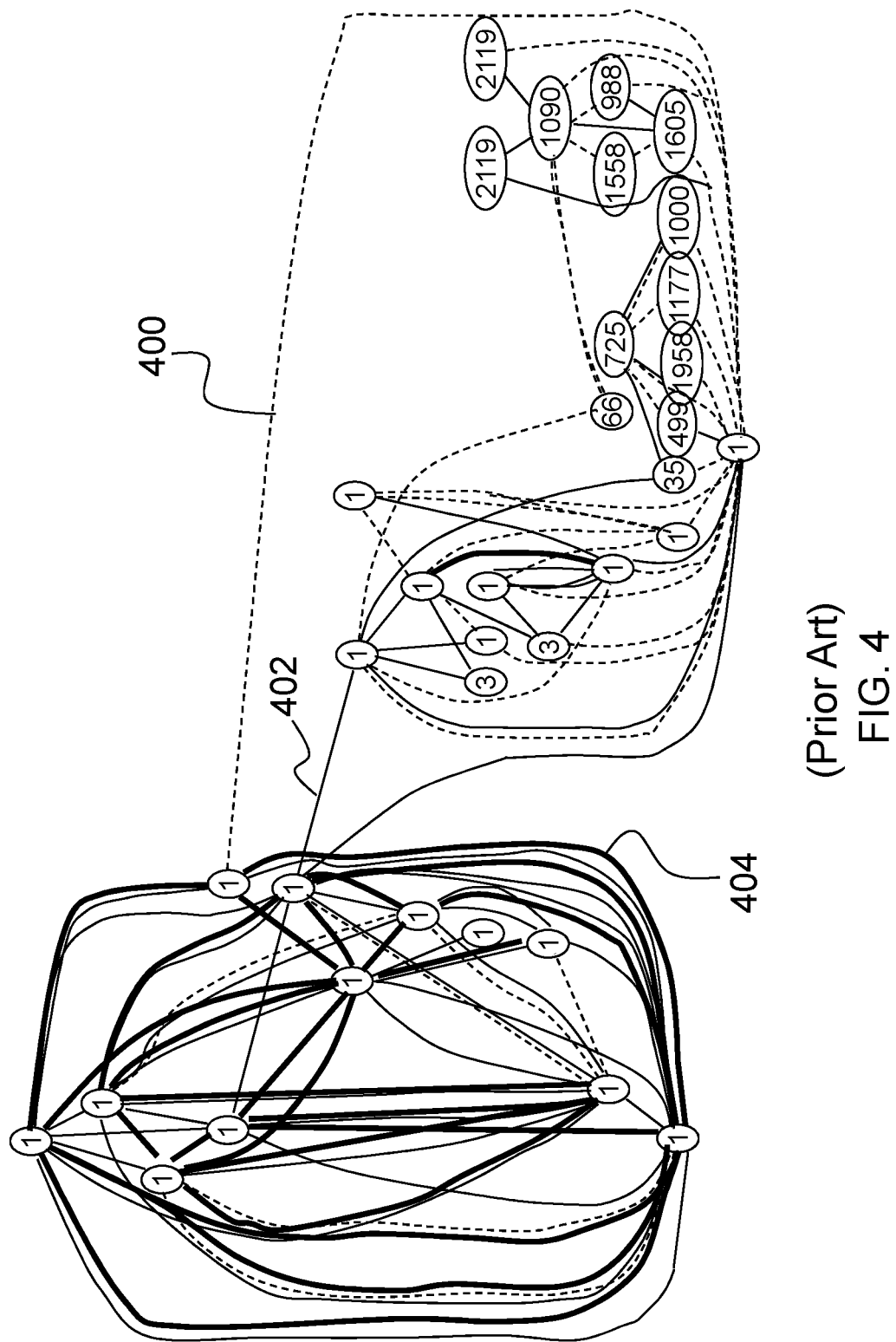
FIG. 4 is an illustration of a number of candidates per template nodes as a result of baseline filters according to prior art.

FIG. 4 is an illustration of a number of candidates per template nodes (represented by circles/ovals) as a result of baseline filters according to prior art. Different types of edges (e.g., solid lines, dashed lines, bold lines) between the template nodes represent different (social media) channels/layers of the multiplex network. Dashed lines (element 400) correspond to FriendFeed™, unbolded lines (element 402) correspond to Twitter™, and bold lines (element 404) correspond to YouTube™. The number inside each node indicates the possible candidates in the background network. Some template nodes have a large number of candidates (e.g., 2119, 1958, 1605), which suggests that the filters may not be powerful enough in pruning irrelevant nodes.

Figure 5:
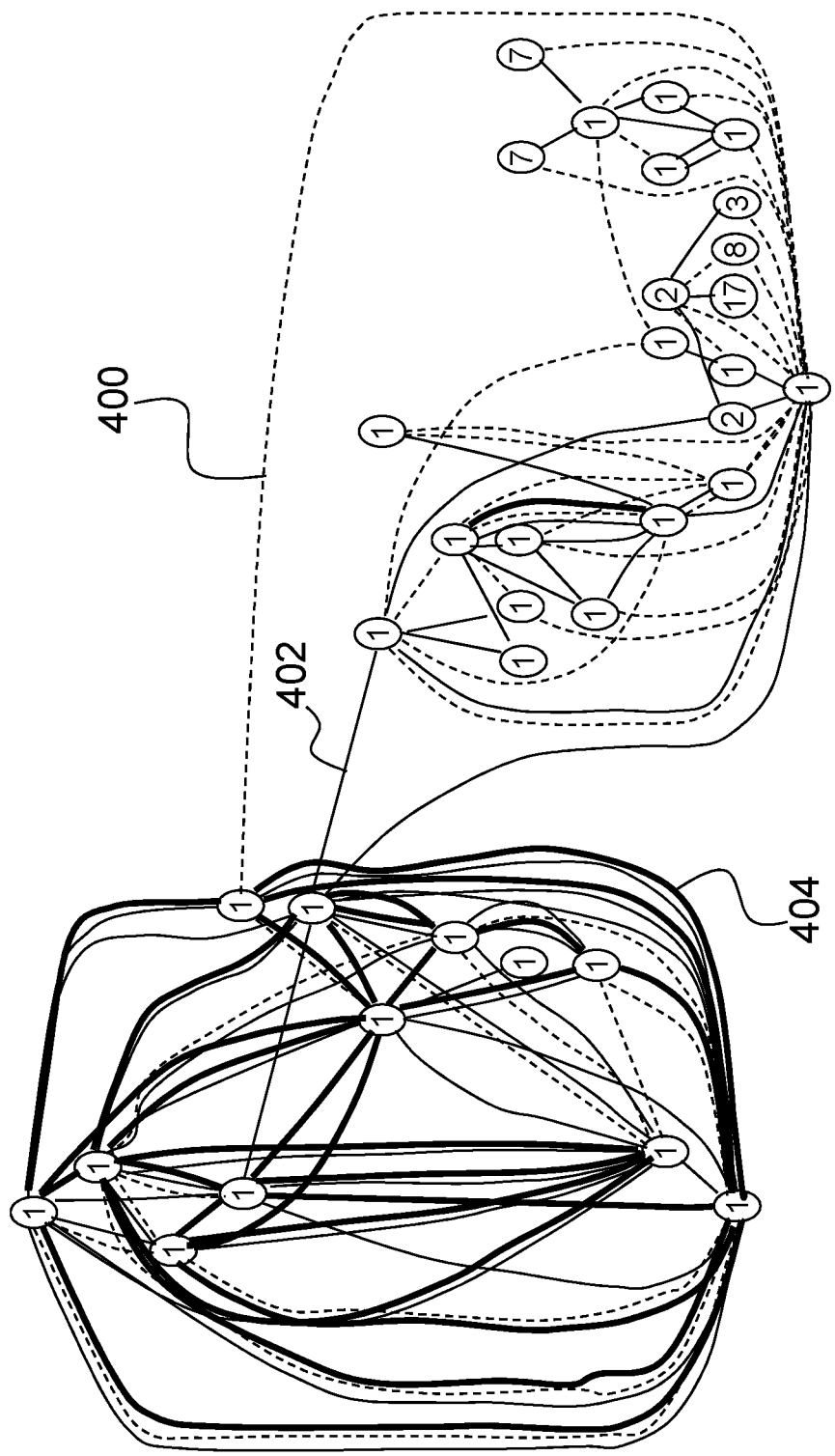
FIG. 5 is an illustration of a number of candidates per template nodes as a result of the enhanced filters according to some embodiments of the present disclosure.

FIG. 5 is an illustration of a number of candidates per template nodes (represented by circles/ovals) as a result of the enhanced filters according to the present invention. As in FIG. 4, different types of edges (e.g., solid lines, dashed lines, bold lines) between the template nodes represent different (social media) channels/layers of the multiplex network. Dashed lines (element 400) correspond to FriendFeed™, unbolded lines (element 402) correspond to Twitter™, and bold lines (element 404) correspond to YouTube™. The result indicates an induced subgraph matching instance. It significantly reduces the number of false candidates. For instance, while FIG. 4 (using baseline filters) has a large number of candidates (e.g., 2119, 1958, 1605), FIG. 5 (the present invention) has significantly lower numbers of candidates (e.g., 1, 2, 3, 7).

FIG. 6 is a table illustrating results of a Real World Graph Challenge comparing the present invention (HRL) to prior art methods. Only the best results for each method are shown. The AUC (area under the curve) values for nodes, edges, noisy nodes, and noisy edges are shown. As shown the technique described herein (denoted as "HRL") had much better results than other approaches on a blind test conducted by Pacific Northwest National Laboratory (PNNL) under the DARPA MAA program (Real World Graph Challenge). Under this test a dataset was given that was constructed using data collected by network science researchers Matteo Magnani and Luca Rossi (see Literature Reference Nos. 2 and 5). The goal was to conduct exact and inexact subgraph matching on the clean and noisy versions of the multiplex background respectively. The results were graded by Area Under ROC score (AUC) for node and edge ranked list.

For each node in the given template, the method according to embodiments of the present disclosure provides a list of the matching candidates. For instance, in the case where each template node has exactly one matching candidate, then the entire matching subgraph is determined by connecting the candidate nodes together. When more than one candidate are listed for the template nodes, then the method described herein will enumerate all possible combinations of the subgraphs. When a matching subgraph is found, the system described herein can automatically generate and output a visual alert, or warning, to a display screen of an analyst indicating a match in the multiplex network was found that may indicate illicit activities and a potential threat.

The invention described herein provides more powerful filters with monotone matrix properties, and supports inexact subgraph matching. The approach according to embodiments of the present disclosure extends existing filtering-based subgraph matching algorithms and provides a new set of filters leveraging the monotone function properties in the multiplex/multilayer network setting. This enables effective pruning of irrelevant subgraph regions and expedites the overall matching process. In addition, the approach described herein is a unique strategy based on maximum likelihood estimate to identify "closely matched" subgraphs that are not isomorphic to the given templates from a noisy background network. This allows generalization of the approach to real-world networks, which are often noisy, incomplete and ambiguous.

Figure 7:
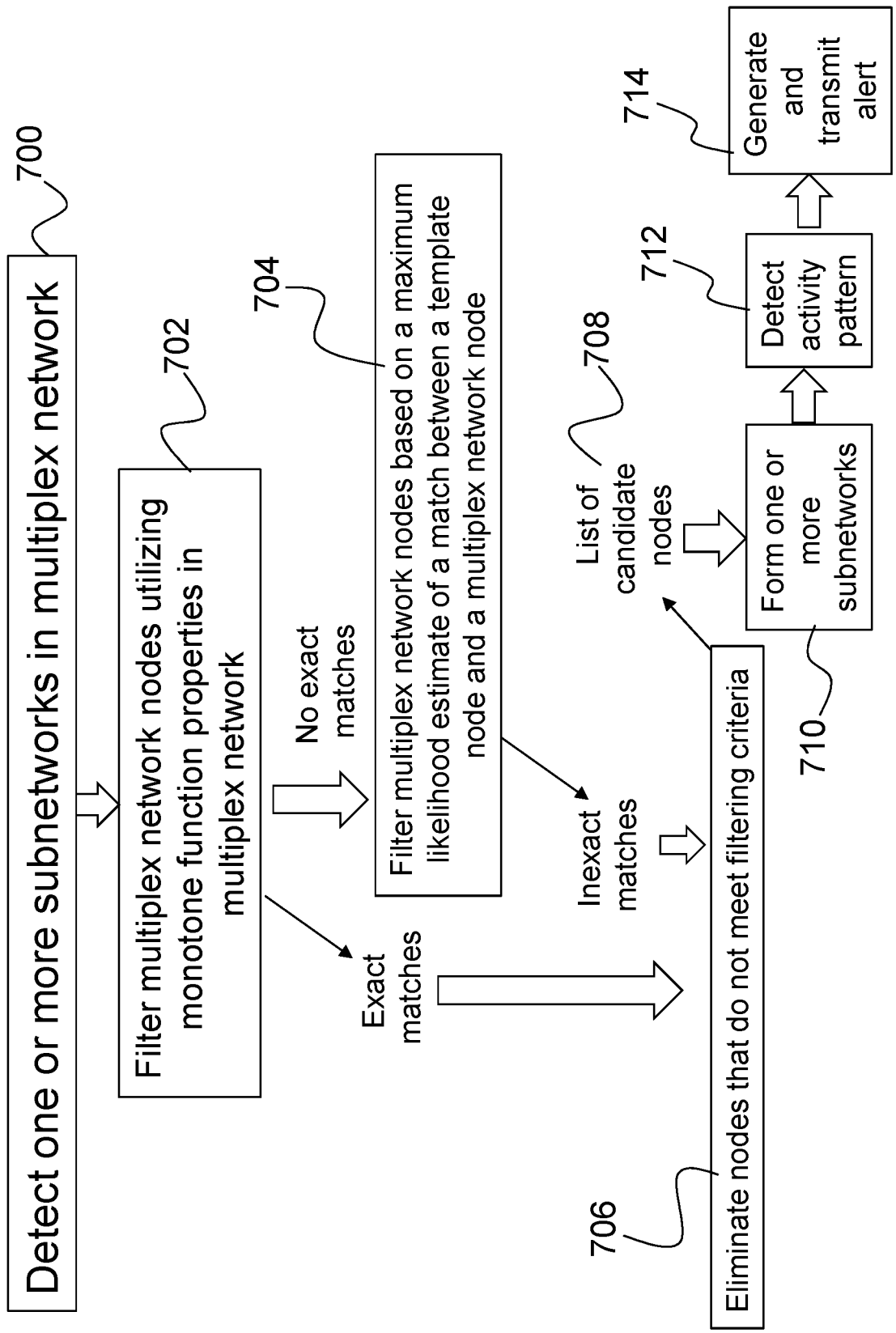
FIG. 7 is a flow diagram illustrating detection of activity patterns in a multiplex network according to some embodiments of the present disclosure.

FIG. 7 is a flow diagram illustrating detection of activity patterns in a multiplex network. One or more subnetworks in a multiplex network that are matches to a template network of template nodes are detected (element 700). The detection includes filtering multiplex network nodes according to a filtering criteria that utilizes monotone function properties in the multiplex network to find exact matches (element 702). If a matching instance is not found, the system finds the closely matching instance (i.e., inexact match) using an additional filtering criteria based on a maximum likelihood estimate of a match between a given template node and a given multiplex network node (element 704). Multiplex network nodes that do not meet the filtering criteria are eliminated (element 706), resulting in a list of candidate nodes in the multiplex network (element 708). The candidate nodes are connected, forming the one or more subnetworks (element 710) (see FIG. 5 for examples of subgraphs). An activity pattern in the one or more subnetworks is detected (element 712), and an alert related to the identified activity pattern is generated and transmitted (element 714), as described below.

Figure 8:
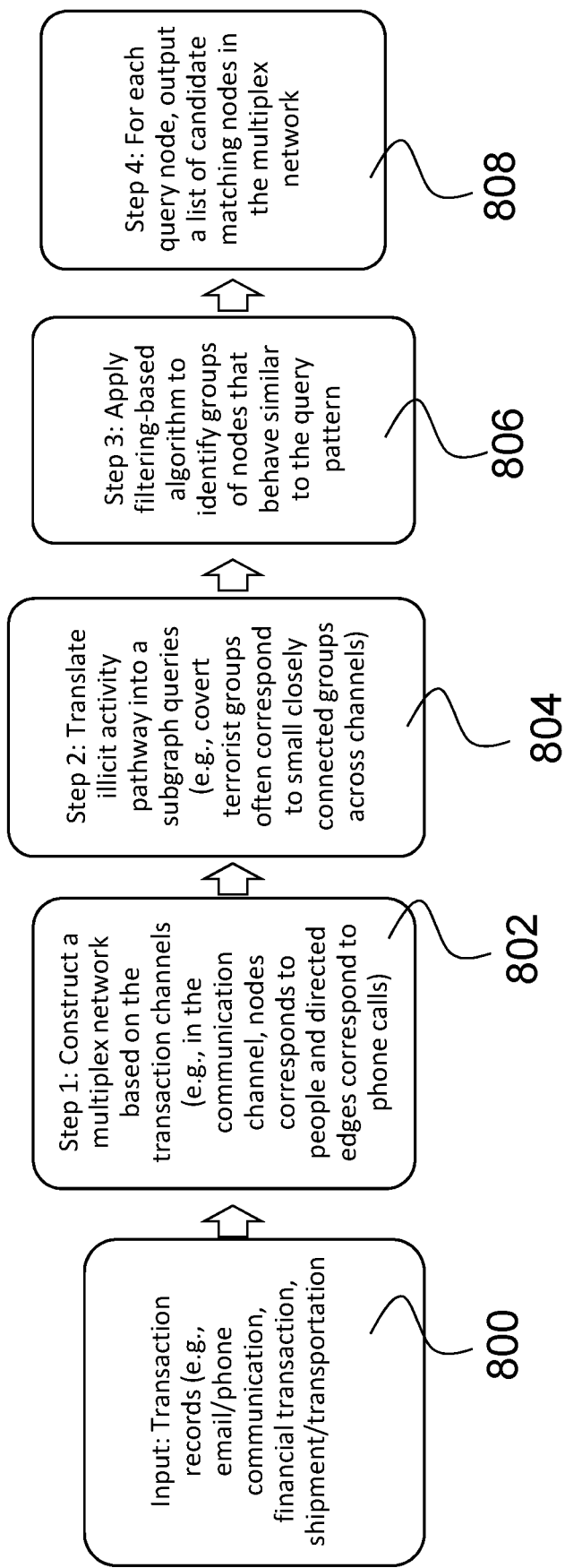
FIG. 8 is a flow diagram illustrating detecting illicit activities based on multi-source network analysis according to some embodiments of the present disclosure.

Multiple applications exist for the invention described herein. FIG. 8 is a flow diagram illustrating a system for detecting illicit activities based on multisource network analysis. For example, transaction records (e.g., email/phone communications, financial transactions, shipment/transportation) are used as input (element 800) into the system. A multiplex network is constructed based on the transaction channels (element 802). For example, in the communication channel, nodes correspond to people and directed edges correspond to phone calls). Illicit activity pathways (e.g., covert groups often correspond to small closely connected groups across channels) are translated into subgraph queries (element 804). The filtering-based algorithm described herein is applied to identify groups of nodes that behave similar to the query pattern (element 806). FIGS. 10 and 11 depict the operations of the matching algorithm and the filter-based algorithm, respectively. The FindMatch algorithm, shown in FIG. 10, is the main procedure, which calls the Filter algorithm, shown in FIG. 11. Both of these algorithms are utilized in identifying groups of nodes that behave similar to the query pattern (element 806). For each query node in the subgraph query, a list of candidate matching nodes in the multiplex network is output (element 808).

Figure 9:
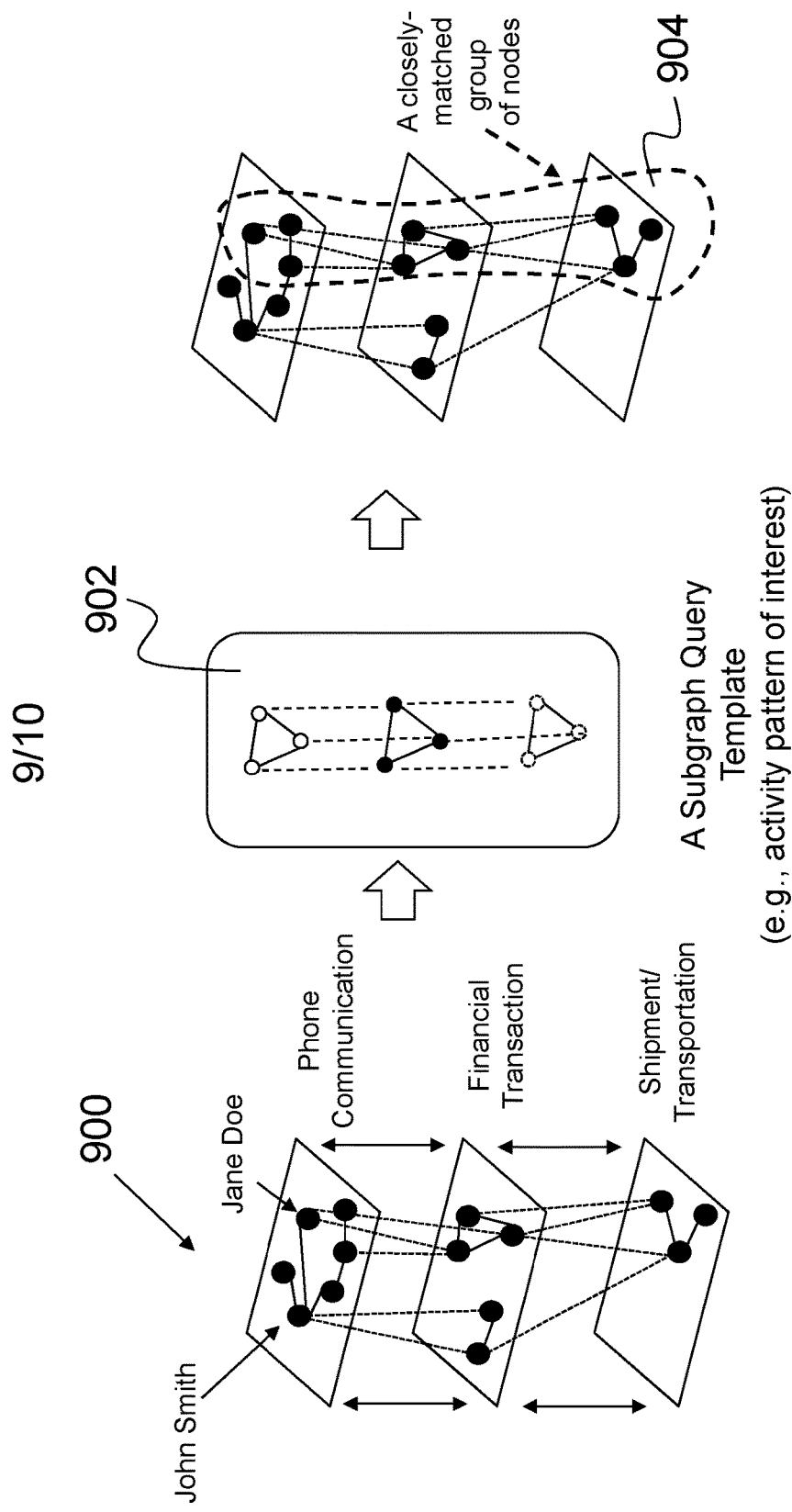
FIG. 9 is an illustration of a closely matched group being identified based on a subgraph query according to some embodiments of the present disclosure.

FIG. 9 depicts a closely matched group being identified based on a subgraph query according to some embodiments of the present disclosure. As shown, a multiplex network (element 900) is queried using a subgraph query template (element 902) (e.g., activity pattern of interest). The output is a closely-matched group of nodes (element 904), also referred to as a matched subgraph.

For example, in a transaction network, the matched subgraphs may indicate a threat pattern of a group of people participating in plot of adversarial activities (e.g., smuggling, illegal arms dealing). In one embodiment of a transaction network, the nodes of the network represent people/individuals, and the edges between nodes represent communications (e.g., phone calls, emails, text messages) between people. Therefore, the subgraph can be used to identify suspicious activity and detect distributed and coordinated attacks perpetrated by adversaries. When a specific activity pattern is detected that indicates suspicious activities, the system described herein can automatically generate and transmit an alert to authorities (e.g., police, military personnel) regarding the individual (or individuals) participating in an adversarial activity. The authorities can perform actions to prevent the activity from occurring, such as installing more police at a geographical location of interest, blocking communications between adversaries, and shutting down traffic in a geographical location of interest.

Moreover, in a protein-protein interaction network, matched subgraphs can indicate a group of proteins that exhibit certain functional properties. Additionally, in an online social network, the matched subgraphs can correspond to an activity pattern of a group of users that share similar topics of interest. As can be appreciated by one skilled in the art, the present invention is applicable to any application that utilizes graph-based modeling and matching.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

what is claimed is:

1. A system for detecting adversarial activities, the system comprising:
one or more processors and a non-transitory computer-readable medium having executable instructions encoded thereon such that when executed, the one or more processors perform an operation of:
detecting, in a multiplex network comprising a plurality of multiplex network nodes, one or more subnetworks that are matches to a template network comprising a plurality of template nodes, wherein detecting the one or more subnetworks comprises:
filtering the plurality of multiplex network nodes according to a filtering criteria that utilizes monotone function properties in the multiplex network;
eliminating nodes from the plurality of multiplex network nodes that do not meet the filtering criteria, resulting in a list of candidate nodes in the multiplex network; and
forming the one or more subnetworks from the list of candidate nodes;
identifying an activity pattern corresponding to a pattern of adversarial activity in the detected one or more subnetworks; and
based on the identified activity pattern, generating and transmitting an alert of adversarial activity,
wherein detecting the one or more subnetworks further comprises filtering the plurality of multiplex network nodes according to an additional filtering criteria based on a maximum likelihood estimate of a match between a given template node and a given multiplex network node,
wherein filtering the plurality of multiplex network nodes according to the additional filtering criteria comprises:
identifying an inexact match in the multiplex network for the template network by minimizing the following cost function:
$\Sigma_{i,j:Nodes(T)}Cost(i,j,m(i),m(j))$, where $Cost(i,j,x,y)=-\log P(T_{i,j},B_{x,y})$, where $T_{i,j}$ is a type of configuration between a node i and a node j in the template network T, $B_{x,y}$ is a type of configuration between nodes x and y in the multiplex network B, $P(a,b)$ is a probability that $T_{i,j}$ corresponds to $B_{x,y}$; and
eliminating node x when the cost is greater than a predetermined value.

2. The system as set forth in claim 1, wherein the multiplex network further comprises a plurality of edges and a plurality of types of configurations of edges linking the plurality of multiplex network nodes, and wherein the one or more processors further perform an operation of modeling noise in the multiplex network as a transition matrix, wherein each entry in the transition matrix is a probability of changing from one type of configuration to another type of configuration.

3. The system as set forth in claim 1, wherein detecting the one or more subnetworks further comprises assigning matching nodes in the multiplex network to the plurality of template nodes using a Hungarian algorithm.

4. The system as set forth in claim 1, wherein the multiplex network is a communications network comprising a plurality of edges linking the plurality of multiplex network nodes, and wherein each multiplex network node represents an individual, and each edge linking a pair of multiplex network nodes represents a communication between the individuals, and wherein the identified activity pattern is a communication pattern.

5. A computer implemented method for detecting adversarial activities, the method comprising an act of:
causing one or more processors to execute instructions encoded on a non-transitory computer-readable medium, such that upon execution, the one or more processors perform operations of:
detecting, in a multiplex network comprising a plurality of multiplex network nodes, one or more subnetworks that are matches to a template network comprising a plurality of template nodes, wherein detecting the one or more subnetworks comprises:
filtering the plurality of multiplex network nodes according to a filtering criteria that utilizes monotone function properties in the multiplex network;
eliminating nodes from the plurality of multiplex network nodes that do not meet the filtering criteria, resulting in a list of candidate nodes in the multiplex network; and
forming the one or more subnetworks from the list of candidate nodes;
identifying an activity pattern corresponding to a pattern of adversarial activity in the detected one or more subnetworks; and
based on the identified activity pattern, generating and transmitting an alert of adversarial activity,
wherein detecting the one or more subnetworks further comprises filtering the plurality of multiplex network nodes according to an additional filtering criteria based on a maximum likelihood estimate of a match between a given template node and a given multiplex network node,
wherein filtering the plurality of multiplex network nodes according to the additional filtering criteria comprises:
identifying an inexact match in the multiplex network for the template network by minimizing the following cost function:
$\Sigma_{i,j:Nodes(T)}Cost(i,j,m(i),m(j))$, where $Cost(i,j,x,y)=-\log P(T_{i,j},B_{x,y})$, where $T_{i,j}$ is a type of configuration between a node i and a node j in the template network T, $B_{x,y}$ is a type of configuration between nodes x and y in the multiplex network B, $P(a,b)$ is a probability that $T_{i,j}$ corresponds to $B_{x,y}$; and
eliminating node x when the cost is greater than a predetermined value.

6. The method as set forth in claim 5, wherein the multiplex network further comprises a plurality of edges and a plurality of types of configurations of edges linking the plurality of multiplex network nodes, and wherein the one or more processors further perform an operation of modeling noise in the multiplex network as a transition matrix, wherein each entry in the transition matrix is a probability of changing from one type of configuration to another type of configuration.

7. The method as set forth in claim 5, wherein detecting the one or more subnetworks further comprises assigning matching nodes in the multiplex network to the plurality of template nodes using a Hungarian algorithm.

8. The method as set forth in claim 5, wherein the multiplex network is a communications network comprising a plurality of edges linking the plurality of multiplex network nodes, and wherein each multiplex network node represents an individual, and each edge linking a pair of multiplex network nodes represents a communication between the individuals, and wherein the identified activity pattern is a communication pattern.

9. A computer program product for detecting adversarial activities, the computer program product comprising:
computer-readable instructions stored on a non-transitory computer-readable medium that are executable by a computer having one or more processors for causing the processor to perform operations of:
detecting, in a multiplex network comprising a plurality of multiplex network nodes, one or more subnetworks that are matches to a template network comprising a plurality of template nodes, wherein detecting the one or more subnetworks comprises:
filtering the plurality of multiplex network nodes according to a filtering criteria that utilizes monotone function properties in the multiplex network;
eliminating nodes from the plurality of multiplex network nodes that do not meet the filtering criteria, resulting in a list of candidate nodes in the multiplex network; and
forming the one or more subnetworks from the list of candidate nodes;
identifying an activity pattern corresponding to a pattern of adversarial activity in the detected one or more subnetworks; and
based on the identified activity pattern, generating and transmitting an alert of adversarial activity,
wherein detecting the one or more subnetworks further comprises filtering the plurality of multiplex network nodes according to an additional filtering criteria based on a maximum likelihood estimate of a match between a given template node and a given multiplex network node,
wherein filtering the plurality of multiplex network nodes according to the additional filtering criteria comprises:
identifying an inexact match in the multiplex network for the template network by minimizing the following cost function:
$\Sigma_{i,j:Nodes(T)}Cost(i,j,m(i),m(j))$, where $Cost(i,j,x,y)=-\log P(T_{i,j},B_{x,y})$, where $T_{i,j}$ is a type of configuration between a node i and a node j in the template network T, $B_{x,y}$ is a type of configuration between nodes x and y in the multiplex network B, $P(a,b)$ is a probability that $T_{i,j}$ corresponds to $B_{x,y}$; and
eliminating node x when the cost is greater than a predetermined value.

10. The computer program product as set forth in claim 9, wherein the multiplex network further comprises a plurality of edges and a plurality of types of configurations of edges linking the plurality of multiplex network nodes, and wherein the one or more processors further perform an operation of modeling noise in the multiplex network as a transition matrix, wherein each entry in the transition matrix is a probability of changing from one type of configuration to another type of configuration.

11. The computer program product as set forth in claim 9, wherein detecting the one or more subnetworks further comprises assigning matching nodes in the multiplex network to the plurality of template nodes using a Hungarian algorithm.

12. The computer program product as set forth in claim 9, wherein the multiplex network is a communications network comprising a plurality of edges linking the plurality of multiplex network nodes, and wherein each multiplex network node represents an individual, and each edge linking a pair of multiplex network nodes represents a communication between the individuals, and wherein the identified activity pattern is a communication pattern.

\* \* \* \* \*